US 6,528,923 B2

(12) United States Patent
Katoh et al.

(10) Patent No.: US 6,528,923 B2
(45) Date of Patent: Mar. 4, 2003

(54) ROTARY ELECTRIC MACHINE WITH STACKED BRUSH

(75) Inventors: Masahiro Katoh, Chiryu (JP); Yasuyuki Wakahara, Kariya (JP); Masami Niimi, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/988,742

(22) Filed: Nov. 20, 2001

(65) Prior Publication Data

US 2002/0070625 A1 Jun. 13, 2002

(30) Foreign Application Priority Data

Dec. 7, 2000 (JP) ........................................ 2000-372816
Dec. 28, 2000 (JP) ........................................ 2000-399707

(51) Int. Cl.⁷ ........................ H01R 39/24; H02K 13/00
(52) U.S. Cl. ........................................ 310/251; 310/233
(58) Field of Search ................................. 310/248, 249, 310/233, 239, 219, 231, 238, 251, 252, 237, 253, 236, 220

(56) References Cited

U.S. PATENT DOCUMENTS

| 554,369 | A | * | 2/1896 | Loomis | ........................ | 310/248 |
| 653,945 | A | * | 7/1900 | Burke | ........................ | 310/236 |
| 783,999 | A | * | 2/1905 | Dunn | ........................ | 310/248 |
| 2,181,076 | A | * | 11/1939 | Siebenmorgen | ............. | 310/248 |
| 2,613,239 | A | * | 10/1952 | Lundy | ........................ | 310/251 |
| 4,019,076 | A | * | 4/1977 | Babes | ........................ | 310/232 |
| 5,083,055 | A | * | 1/1992 | Hokanson | .................... | 310/220 |
| 5,712,522 | A | | 1/1998 | Niimi | ........................ | 310/248 |

FOREIGN PATENT DOCUMENTS

| JP | 6233498 A | * | 8/1994 |
| JP | 7184356 A | * | 7/1995 |
| JP | 9172756 A | * | 6/1997 |

* cited by examiner

Primary Examiner—Nestor Ramirez
Assistant Examiner—Guillermo Perez
(74) Attorney, Agent, or Firm—Oliff & Berridge, PLC

(57) ABSTRACT

A rotary electric machine includes a stacked brush, where low-resistance and high-resistance brush layers are disposed at the front and rear end sides in the rotational direction of a commutator, respectively. When the insulation gap between the neighboring segments of a commutator is "a" and the width of the high-resistance brush layer is "b", "a" and "b" are determined to satisfy $a<b$ and $b/a<4$ to reduce sparks and improve commutation property. In order to reduce spark generation at the brush front end, especially, when the circumferential width of the segment is "c" and the width of the low-resistance brush layer is "d", "a" to "d" are determined to satisfy $b+d>2\times a+c$, $d>b$, $a<b$ and $d<a+c$.

5 Claims, 5 Drawing Sheets

ROTARY ELECTRIC MACHINE WITH STACKED BRUSH

CROSS-REFERENCE TO RELATED APPLICATION

This application is related to and claims priority from Japanese Patent Applications No. 2000-372816 filed on Dec. 7, 2000 and No. 2000-399707 filed on Dec. 28, 2000, the contents of which are hereby incorporated by reference.

BACKGROUND OF THE INVENTION

1. Field of the Invention

The present invention relates to a rotary electric machine which includes a stacked brush formed by layering plural brush layers each having different specific resistance.

2. Description of Related Art

U.S. Pat. No. 5,712,522 (JP-A-9-49478) discloses a starter where a stacked brush (two-layered brush) is adopted to improve a commutation property. As shown in FIGS. 9A–9C, the stacked brush is formed by layering two kinds of brush layers (low-resistance brush layer 100 and high-resistance brush layer 110) each having different specific resistance. The low-resistance brush layer 100 is disposed at the front end side in the rotational direction of a commutator, and the high-resistance brush layer 110 is disposed at the rear end side in the rotational direction of the same.

However, a commutation property cannot be sufficiently improved sometimes. For example, when the width "a" of the undercut 130 between the neighboring segments 120 of the commutator is larger than the width "b" of the high-resistance brush layer 110 (a>b), the rear end of the high-resistance brush layer 110 departs from the present segment 120 before the front end (attachment surface between the low-resistance brush layer 100 and the high-resistance brush layer 110) of the high-resistance brush layer 110 comes in contact with the next segment 120. That is, when the rear end of the high-resistance brush layer 110 departs from the present segment 120, the front end of the high-resistance brush layer 110 does not come in contact with the next segment 120, thereby lessening the effect of the stacked brush.

In a recent starter, a speed reduction ratio tends to be increased for reducing its size. Since the number of times of commutation is increased by increasing the revolution speed of an armature, a commutation property is required to be improved. When the armature current is large, shorting current flowing into the brush becomes large when the brush moves to the next segment. As a result, when the rear end of the brush (rear end of the high-resistance brush layer) departs from the segment, a large spark is generated, thereby reducing motor output and a brush lifetime.

Especially, the revolution speed of the commutator of the starter fluctuates largely, and a current is made to flow into the commutator at a rated value in a short time. Therefore, an undercut portion is liable to clog due to wear powder of the brush, so that the undercut width is set comparatively large. Accordingly, the above trouble is liable to occur more often.

When the width of the high-resistance brush layer 110 is enlarged too much, the entire resistance of the brush is increased, thereby reducing a motor output.

Further, in some recent starters, the brush comes in contact with three segments at a maximum at the same time in consideration of the balance between output and a brush lifetime. When the two-layered brush is adopted in this construction, the entire width of the brush is larger than the summated width of the segment 120 and two undercut portions (insulation portions) 130 as shown in FIGS. 10A–10C. In this case, when the width of the low-resistance brush layer 100 is set larger than the summated width of one segment 120 and one undercut portion 130, the following problem arises.

It is assumed that three segments 120are sequentially arranged in the circumferential direction as a first segment 120A, a second segment 120B and a third segment 120C from the front side to the rear side in the rotational direction of the segments.

When the high-resistance brush layer 110 does not come in contact with the second segment 120B before the front end of the low-resistance brush layer 120 comes in contact with the third segment 120C, the following trouble is caused. That is, when the front end of the low-resistance brush layer 100 comes in contact with the third segment 120C (FIG. 10C), a large shorting current flows between the front and rear segments (second segment 120B and third segment 120C) through the low-resistance brush layer 100. In this case, since the shorting current cannot be made lower even by the two-layered brush, a spark is generated at the front end of the low-resistance brush layer 100, thereby reducing the lifetime of the brush.

SUMMARY OF THE INVENTION

The present invention has been made in view of the above problem, and its object is to provide a high-performance rotary electric machine where the effect of a stacked brush can be exhibited and less sparks are generated by improving a commutation property.

In the present invention, rotary electric machine includes a stacked brush, where a low-resistance brush layer is disposed at the front end side in the rotational direction of a commutator and a high-resistance brush layer is disposed at the rear end side in the rotational direction. In the rotary electric machine, a width "a" of an insulation gap, provided between neighboring segments of the commutator, and a width "b" of the high-resistance brush layer are determined to satisfy a<b. Therefore, when the high-resistance brush layer moves to a next segment, the high-resistance brush layer comes in contact with the segments at front and rear sides of the insulation gap at the same time.

Accordingly, the commutation property is improved by exhibiting the effect of the stacked brush, and an output property can be improved. Further, the number of spark generation is reduced by the high-resistance brush layer, and the brush lifetime is increased.

Preferably, the width are further determined to satisfy b/a<4. Therefore, the entire resistance of the brush is restricted from being increased, thereby preventing a motor output from being increased, thereby preventing a motor output from being reduced.

In the rotary electric machine, preferably, a width "c" of the segment in a circumferential direction and a width "d" of the low-resistance brush layer in the stack direction are determined to satisfy d<a+c. Therefore, when the low-resistance brush layer comes in contact with the present segment and the next segment at the same time, the high-resistance brush layer comes in contact with the present segment together with the low-resistance brush layer. Thereby the shorting current between the segments (present segment and next segment) through the stacked brush is reduced. Thus, the number of the spark generation at the front end of the low-resistance brush layer can be reduced, and the lifetime of the stacked brush can be restricted from being reduced.

Thus, the commutaion property can be improved by the stacked brush, and the output property can be also improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

The present invention will be described hereinafter with reference to various embodiments, in which a rotary electric machine is used as a starter motor for an engine.

First Embodiment

Figure 1:
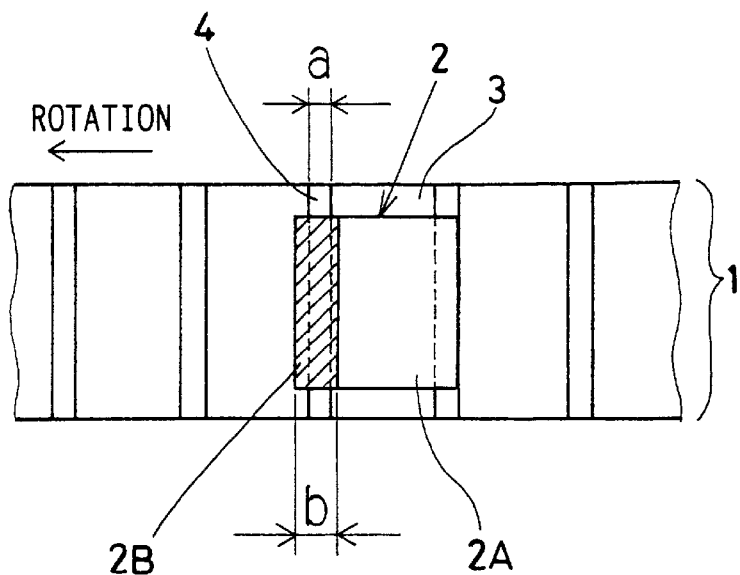
FIG. 1 is a fragmentary schematic view showing the positional relationship between a brush and segments according to a first embodiment of the present invention.

In FIG. 1, a brush 2 is disposed on a commutator 1 provided in an armature. A motor current is supplied to the armature through the commutator 1 and the brush 2.

The commutator 1 includes plural conductive segments 3, which are arranged in a cylindrical shape while a given gap as an undercut portion 4 remains between neighboring segments 3 for insulation. Each segment 3 is connected to an armature coil (not shown) wound around the armature.

The brush 2 is formed by layering a low-resistance brush layer 2A and a high-resistance brush layer 2B each having different specific resistance. The low-resistance brush layer 2A is disposed at the front end side in the rotational direction(arrow direction) of the commutator 1. The high-resistance brush layer 2B is disposed at the rear end side in the rotational direction.

The insulation gap (undercut portion 4) provided between the neighboring segments 3 of the commutator 1 has a width "a", and the high-resistance brush layer 2B has a width "b". The widths "a" and "b" are defined as follows.

$$a<b \tag{1}$$

$$b/a<4 \tag{2}$$

Next, operation and an effect in the first embodiment will be described with reference to FIGS. 2A–2C.

Figure 2A:
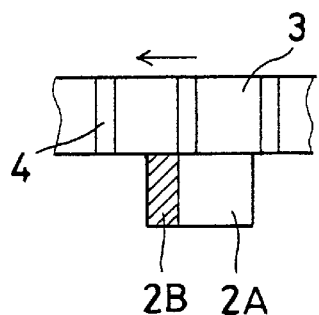
FIGS. 2A–2C are schematic views each showing the positional relationship between the brush and the segments according to the first embodiment.
Figure 2B:
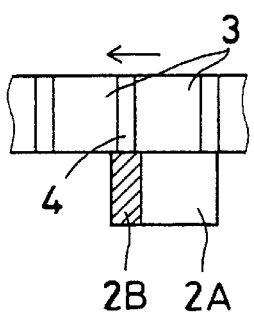
Figure 2C:
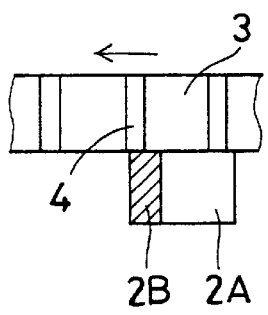

When the brush 2 slides over the commutator 1 while the armature is rotated, the positional relationship between each segment 3 and the brush 2 is gradually changed from the state of FIG. 2A to the state of FIG. 2C.

When the high-resistance brush layer 2B moves to the next segment 3, that is, when the positional relationship is changed from the state of FIG. 2A to the state of FIG. 2C, the high-resistance brush layer 2B comes in contact with the segment 3 at the front and rear sides of the undercut portion 4 at the same time due to the relationship (1) as shown in FIG. 2B.

In this case, before the rear end of the high-resistance brush layer 2B departs from the present segment 3, the front end of the high-resistance brush layer 2B comes in contact with the next segment 3. Therefore, the commutation property is improved by the stacked brush 2 including the high-resistance brush layer 2B. As a result, the output property can be improved, and the lifetime of the brush 2 can be increased. Since the shorting current flows through the high-resistance brush layer 2B, the shorting current is lowered, and the number of spark generation can be reduced.

Figure 3:
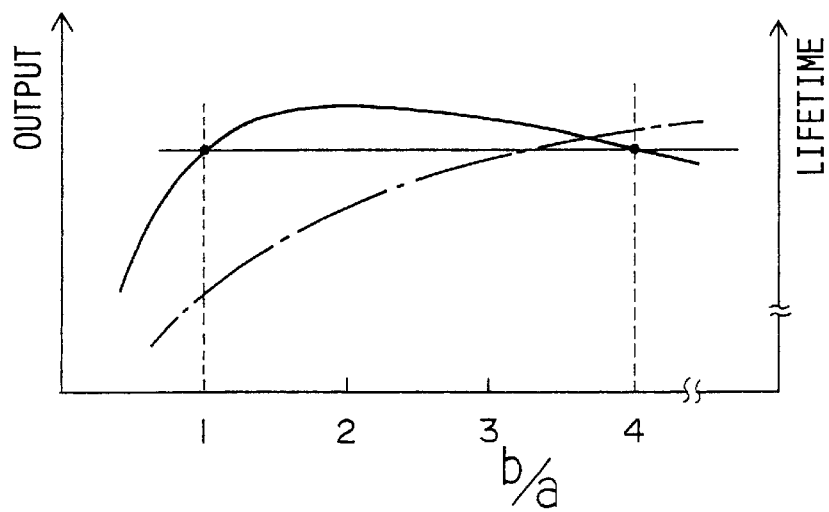
FIG. 3 is a graph representation showing the performance of the first embodiment.

Here, when the width of the high-resistance brush layer 2B is enlarged too much, the entire resistance of the brush 2 is increased, thereby reducing a motor output. Specifically, as the width "b" of the high-resistance brush layer 2B is increased, the entire resistance of the stacked brush 2 is increased. Therefore, current, flowing into the armature coil through the stacked brush 2 and the segments 3, is lowered, so that the output is reduced. That is, when the width "b", of the high-resistance brush layer 2B is increased in comparison with the insulation gap "a" between the neighboring segments 3, the number of spark generation is reduced, so that the effect of the stacked brush 2 is exhibited and the output is increased. At the same time, however, the output is reduced due to the entire-resistance increase of the stacked brush 2. As a result, as shown in FIG. 3, although the output (solid line) is increased at first, it is gradually reduced thereafter as b/a increases. Therefore, b/a is required to be made smaller than a predetermined value, and the predetermined value is preferably set at four. Thus, the above relationship (2) is obtained.

Accordingly, when the above relationships (1), (2) are satisfied, the commutation property can be improved by the stacked brush 2, and the output reduction due to the resistance increase of the brush 2 can be reduced.

Second Embodiment

Figure 4A:
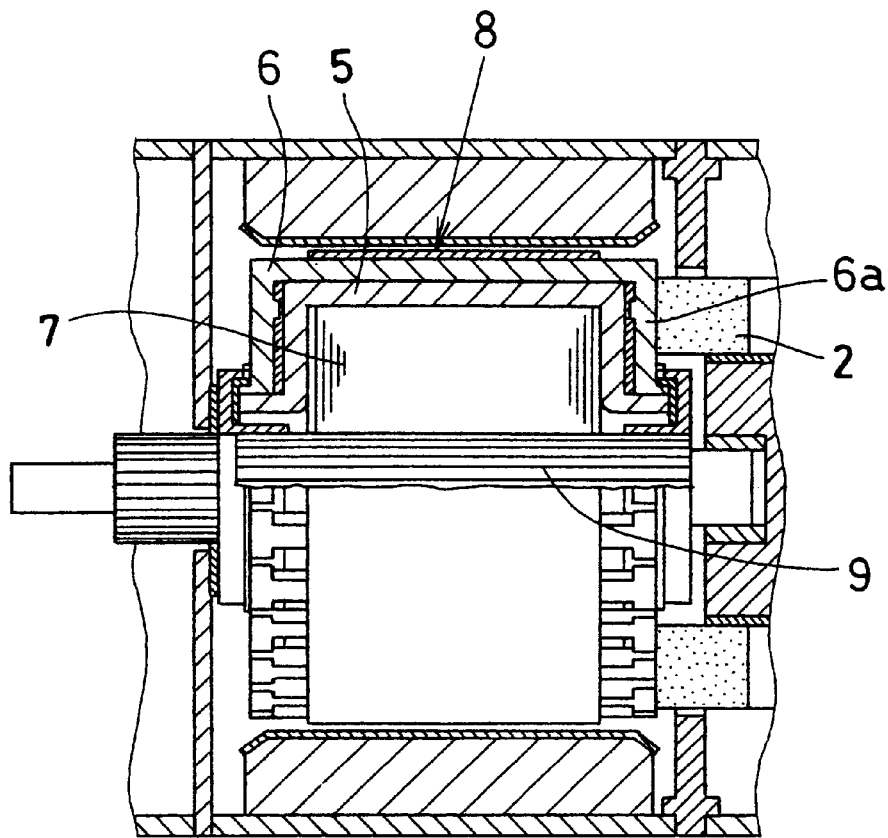
FIGS. 4A and 4B are sectional views each showing a rotary electric machine according to a second embodiment of the present invention.
Figure 4B:
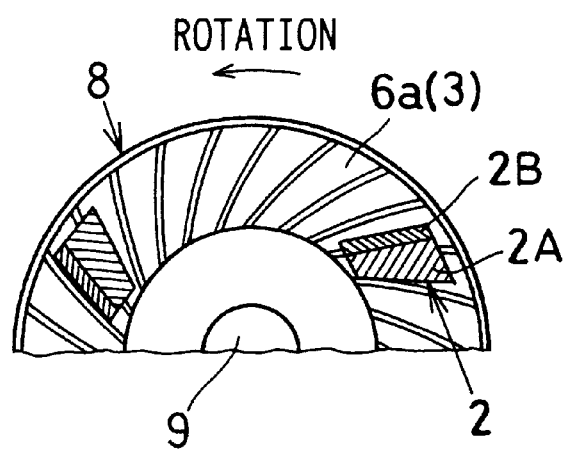

In the rotary electric machine in a second embodiment, as shown in FIG. 4A, an armature coil is formed by attaching plural inner-layer coil segments 5 and plural outer-layer coil segments 6, which are U-shaped, to a core 7 and by brazing both coil segments 5, 6 in order. Further, a surface-type commutator is constructed by coil end portions 6a each provided as each segment 3 at the end of each outer-layer coil segment 6. The surface-type commutator is provided so that each segment 3 (coil end portion 6a of the outer-layer coil segment 6) is perpendicular to a rotational shaft 9 of an armature 8. The brush 2 comes in contact with each segment 3 in the axial direction. As in shown in FIG. 4B, the low-resistance brush layer 2A is disposed at the front side in the rotational direction of the armature 8, and the high-resistance brush layer 2B is disposed at the rear side in the rotational direction.

In this rotary electric machine, too, as in the first embodiment, the following relationships are satisfied between the insulation gap "a" and the stack direction width "b".

$$a<b \quad (1)$$

$$b/a<4 \quad (2)$$

Accordingly, the commutation property can be improved by the stacked brush 2, and the output reduction due to the resistance increase of the brush 2 can be reduced.

Third Embodiment

Figure 5:
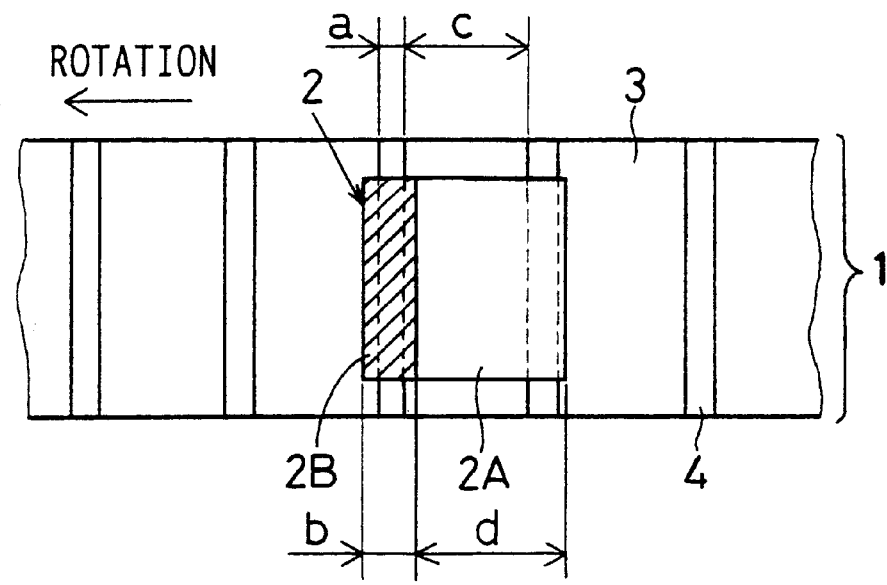
FIG. 5 is a fragmentary schematic view showing the positional relationship between a brush and segments according to a third embodiment of the present invention.

In a third embodiment, as shown in FIG. 5, the segment 3 has the circumferential width "c", and the insulation portion (undercut portion 4) has the width "a" as in the first embodiment. The high-resistance brush layer 2B has the stack direction width "b" as in the first embodiment, and the low-resistance brush layer 2A has the stack direction width "d". The following relationships are satisfied among these dimensions.

$$b+d>2\times a+c \quad (3)$$

$$d>b \quad (4)$$

$$a<b \quad (5)$$

$$d<a+c \quad (6)$$

That is, the brush 2 has the size to come in contact with three segments, sequentially arranged in the circumferential direction, at a maximum at the same time. The stack direction width of the low-resistance brush layer 2A is set larger than the stack direction width of the high-resistance brush layer 2B. The high-resistance brush layer 2B has the width to come in contact with the segments 3 at both front and rear sides of the undercut portion 4 at the same time.

Next, operation and an effect in the third embodiment will be described with reference to FIGS. 6A–6C. Three segments 3, sequentially arranged in the circumferential direction, are indicated by the first segment 3A, the second segment 3B and the third segment 3C in this order from the front side to the rear side in the rotational direction.

Figure 6A:
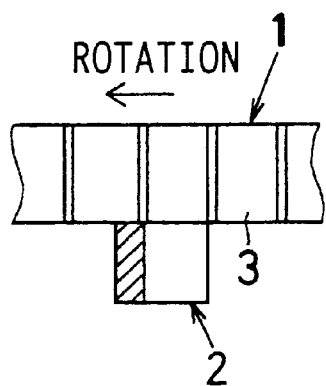
FIGS. 6A–6C are schematic views each showing the positional relationship between the brush and the segments according to the third embodiment.
Figure 6B:
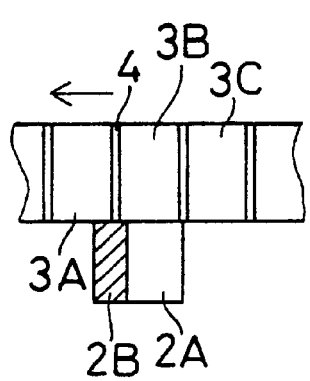
Figure 6C:
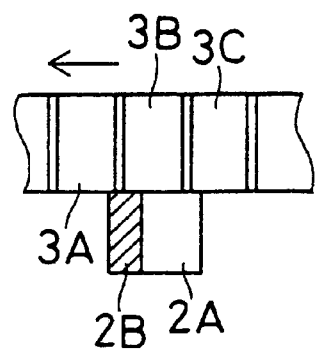

When the brush 2 slides over the commutator 1 while the commutator 1 is rotated, the positional relationship between each segment 3 and the brush 2 is gradually changed as shown in FIGS. 6A–6C.

Since the above relationships (5) and (6) are satisfied, as shown in FIG. 6B, the front side of the high-resistance brush layer 2B comes in contact with the second segment 3B before the front side of the low-resistance brush layer 2A comes in contact with the third segment 3C. At this time, further, the rear end of the high-resistance brush layer 2B also comes in contact with the first segment 3A. Accordingly, as shown in FIG. 6C, when the low-resistance brush layer 2A comes in contact with the second segment 3B and the third segment 3C at the same time, the high-resistance brush layer 2B comes in contact with the second segment 3B together with the low-resistance brush layer 2A. Thereby the shorting current between the segments (second segment 3B and third segment 3C) through the brush 2 is reduced. Thus., the number of the spark generation at the front end of the brush 2 (front end of the low-resistance brush layer 2A) can be reduced, and the lifetime of the brush 2 can be restricted from being reduced.

Since the above relationship (5) is satisfied, when the high-resistance brush layer 2B moves to the next segment 3, that is, when the state shown in FIG. 6A is changed to the state shown in FIG. 6B, the high-resistance brush layer 2B can come in contact with the segments 3 (first segment 3A and second segment 3B) at the front and rear sides of the undercut portion 4 at the same time. In this case, the front end of the high-resistance brush layer 2B comes in contact with the second segment 3B before the rear end of the high-resistance brush layer 2B departs from the first segment 3A. Therefore, the commutation property can be improved by the two-layered brush 2, and output property can be improved.

Further, the above relationship (3) is set in consideration of the balance between the motor output and the brush lifetime, and the relationship (4) is set in consideration of the reduction of the motor output due to the entire-resistance increase of the stacked brush 2.

Fourth Embodiment

Figure 7:
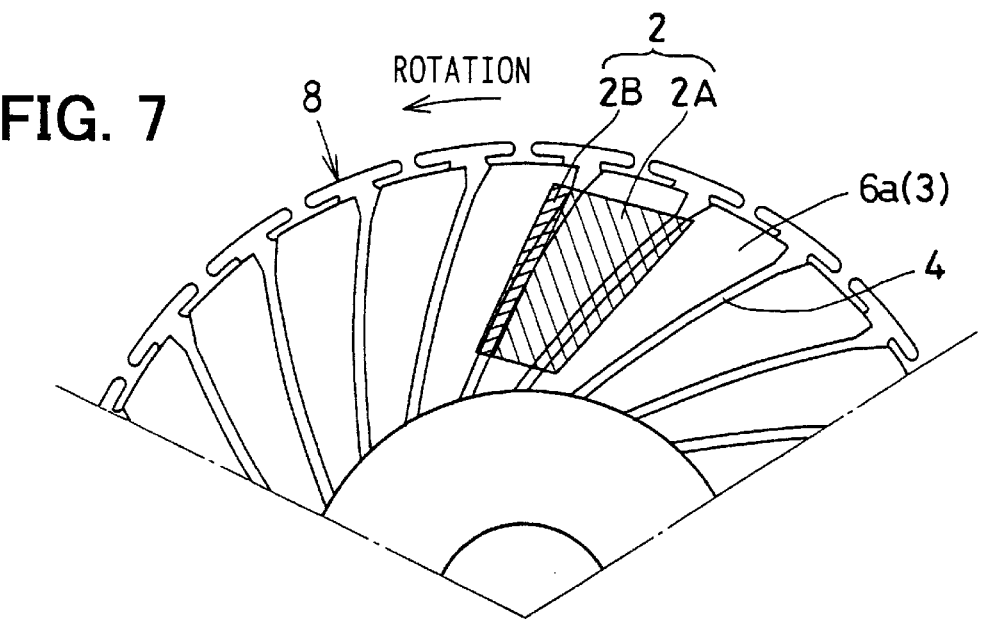
FIG. 7 is a front view showing a surface-type commutator and the brush in the axial direction according to a fourth embodiment of the present invention.

As in the second embodiment, a rotary electric machine in a fourth embodiment includes the surface-type commutator having the coil end portions 6a of the outer-layer coil segments 6 as the segments 3 as shown in FIG. 7. In the rotary electric machine, when the high-resistance brush layer 2B of the brush 2 moves to the next segment 3, at least one portion of the high-resistance brush layer 2B comes in contact with the segments 3 at the front and rear sides of the undercut portion 4 at the same time.

That is, the coil end portion 6a (segment 3) of the outer-layer coil segment 6 is inclined from the outer radial end to the inner radial end in the circumferential direction, and it is gradually curved in the circumferential direction of the armature 8. In this case, the undercut portion 4 is also inclined from the outer radial side to the inner radial side in the circumferential direction. When the high-resistance brush layer 2B moves to the next segment 3 while the armature 8 is rotated, therefore, the width of the high-resistance brush layer 2B is required to be considerably enlarged in order that the high-resistance brush layer 2B comes in contact with the segments 3 at the front and rear sides of the undercut portion 4 at the same time from the inner radial end to the outer radial end.

However, the high-resistance brush layer 2B is not necessarily required to come in contact with the segments 3 at the front and rear sides of the undercut 4 at the same time from the inner radial end to the outer radial end in order to obtain the effect of the stacked brush 2. In the case shown in FIG. 7, for example, the high-resistance brush layer 2B comes in contact with the front side segment 3 at the outer radial side and with the next segment 3 at the inner radial side.

In the fourth embodiment, accordingly, even when the relationships (1), (2) set in the first and second embodiments are not satisfied, the commutation property can be improved by the stacked brush 2.

Figure 8A:
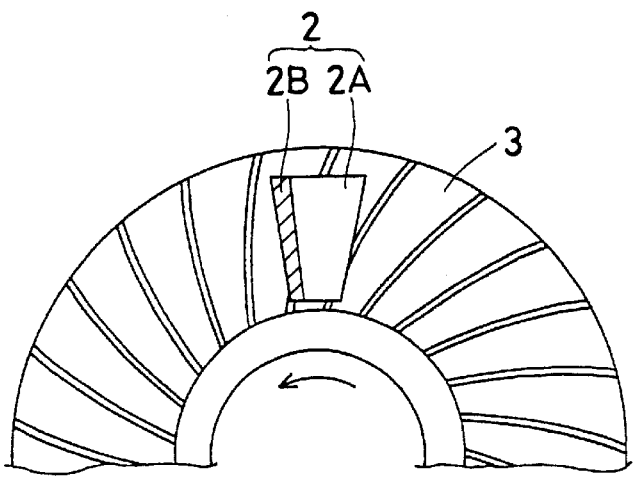
FIGS. 8A and 8B are front views each showing a surface-type commutator and the brush in the axial direction in a modification of the fourth embodiment.

As a modification of the fourth embodiment, the brush 2 shown in FIG. 7 is inclined at the front and rear end surfaces in the circumferential direction so that the shape of the brush 2 corresponds to the shape of the segment 3. As shown in FIG. 8A, for example, the brush may have a trapezoidal shape where the circumferential width of the brush 2 is gradually reduced from the outer radial side to the inner radial side.

Figure 8B:
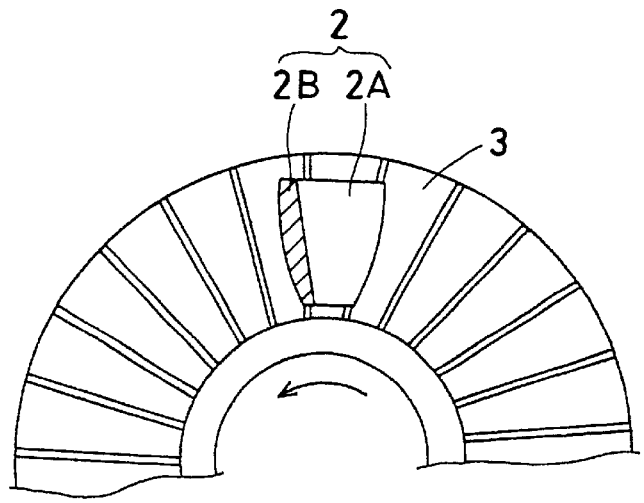
Figure 9A:
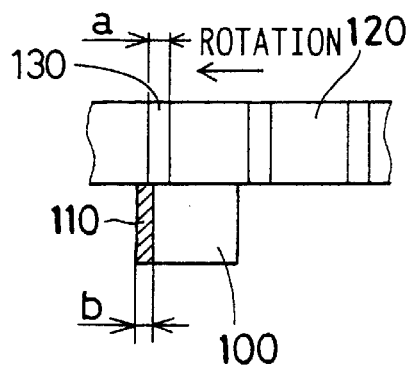
FIGS. 9A–9C are schematic views each showing the positional relationship between segments and a brush in a prior art.
Figure 9B:
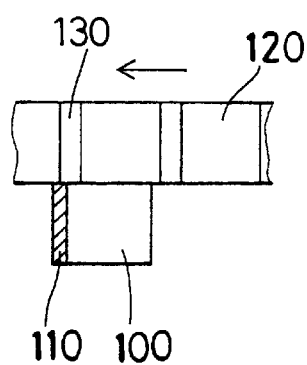
Figure 9C:
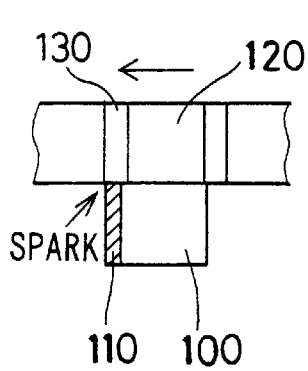
Figure 10A:
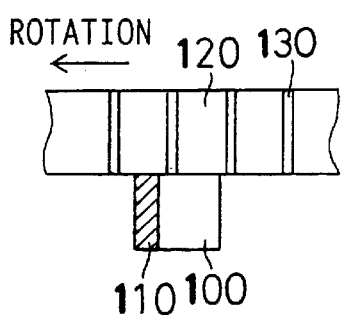
FIGS. 10A–10C are schematic views each showing the positional relationship between segments and a brush in another prior art.
Figure 10B:
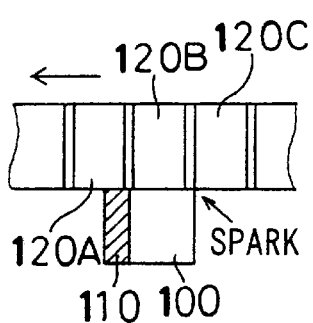
Figure 10C:
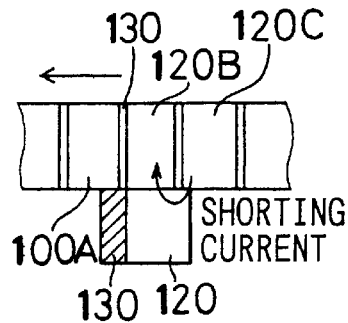

As shown in FIG. 8B, the segment 3 may have a shape where the circumferential width of the segment 3 is gradually increased radially from the rotation center to the outside. The brush 2 corresponding to this segment 3 has a shape where both side surfaces of the brush 2 are curved outside in the circumferential direction.

In a direct current motor (starter motor) used in a starter, further, the width of the undercut portion is set comparatively wider to restrict the undercut portion from clogging due to wear powder. In this case, when the rotary electric machine according to the above embodiments is used as a starter motor, the effect of the stacked brush can be exhibited and an output value of the starter motor can be prevented from being reduced.

While the present invention has been shown and described with reference to the foregoing preferred embodiments, it will be apparent to those skilled in the air that changes in form and detail may be made therein without departing from the scope of the invention as defined in the appended claims.

What is claimed is:

1. A rotary electric machine, comprising:

an armature including a commutator composed of a plurality of conductive segments; and a stacked brush provided by layering a low-resistance brush layer and a high-resistance brush layer each having different specific resistance, the low-resistance brush layer being disposed at a front end side in a rotational direction of the commutator, the high-resistance brush layer being disposed at a rear end side in the rotational direction, the brush being slidable over the commutator, wherein the commutator has an insulation gap provided between neighboring segments of the commutator, and a width "a" of the insulation gap and a width "b" of the high-resistance brush layer in a stack direction are determined to satisfy $a<b$ so that when the high-resistance brush layer moves to a next segment, the high-resistance brush layer comes in contact with the segments at front and rear sides of the insulation gap at a same time, and the plurality of segments are insulated from one another and arranged as a first segment, a second segment and a third segment in sequence from a front side to a rear side in the rotational direction, the stacked brush has a size to come in contact with the first segment to the third segment at a maximum at a same time, and a front end of the high-resistance brush layer comes in contact with the second segment and a rear end of the high-resistance brush layer comes in contact with the first segment before a front end of the low-resistance brush layer comes in contact with the third segment.

2. The rotary electric machine according to claim 1, wherein the widths are further determined to satisfy $b/a<4$.

3. The rotary electric machine according to claim 1, wherein a width "c" of the segment in a circumferential direction and a width "d" of the low-resistance brush layer in the stack direction are determined to satisfy $b+d>2\times a+c$, $d>b$ and $d<a+c$.

4. The rotary electric machine according to claim 1, wherein:

the commutator is provided in the armature at an axial end surface perpendicular to a rotational shaft of the armature; and the segment is inclined from an outer radial end to an inner radial end in a circumferential direction.

5. The rotary electric machine according to claim 1, wherein the commutator and the brush are provided in a direct current motor for starting an engine.

* * * * *